US010495470B2

(12) United States Patent
Lynch (10) Patent No.: US 10,495,470 B2
(45) Date of Patent: *Dec. 3, 2019

(54) MAP HAVING COMPUTER EXECUTABLE INSTRUCTIONS EMBEDDED THEREIN

(71) Applicant: HERE Global B.V., Eindhoven (NL)

(72) Inventor: James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,348

(22) Filed: Aug. 8, 2018

(65) Prior Publication Data

US 2018/0347994 A1    Dec. 6, 2018

Related U.S. Application Data

(63) Continuation of application No. 15/210,166, filed on Jul. 14, 2016, now Pat. No. 10,072,937.

(51) Int. Cl.
*G01C 21/32* (2006.01)
(52) U.S. Cl.
CPC .................................... *G01C 21/32* (2013.01)
(58) Field of Classification Search
CPC ....................................................... G01C 21/32
See application file for complete search history.

(56) References Cited

U.S. PATENT DOCUMENTS

| 5,731,978 | A | 3/1998 | Tamai et al. |
| 10,072,937 | B2 | 9/2018 | Lynch |
| 2010/0004903 | A1 | 1/2010 | Fargas et al. |
| 2011/0047338 | A1 | 2/2011 | Stahlin et al. |
| 2012/0158284 | A1 | 6/2012 | Tanizaki |
| 2015/0149074 | A1 | 5/2015 | Lepistö et al. |

(Continued)

FOREIGN PATENT DOCUMENTS

| CN | 104354697 A | 2/2015 |
| EP | 2354762 A1 | 8/2011 |
| WO | WO 2015/0126309 A1 | 8/2015 |

OTHER PUBLICATIONS

Fu, Liping, "An Adaptive Routing Algorithm for In-Vehicle Route Guidance Systems with Real-time Information", *Transportation Research Part B*, 2001, pp. 749-765, Elsevier, Ltd., U.K.

(Continued)

*Primary Examiner* — Anne M Antonucci
(74) *Attorney, Agent, or Firm* — Alston & Bird LLP (57) ABSTRACT

In an example embodiment, a component of a mobile computing apparatus that comprises a digital map stored on a computer-readable medium is provided. The digital map comprises a first plurality of data records, each of the first plurality of data records represents a corresponding traversable map element. At least some of the first plurality of data records further comprise an executable instruction. The executable instruction of a particular data record is executed upon determination that the mobile computing apparatus is at a position corresponding to a location of the corresponding map element represented by the particular data record. The executable instruction is executed by a processor and causes data received from a hardware component of and/or in communication with the mobile computing apparatus (e.g., one or more sensors and/or the like) to be analyzed in accordance with an algorithm encoded by or referenced by the executable instruction.

20 Claims, 5 Drawing Sheets

(56) References Cited

U.S. PATENT DOCUMENTS

2015/0168157 A1  6/2015  Hoch
2016/0003972 A1  1/2016  Angermann et al.

OTHER PUBLICATIONS

Samaranayake S., et. al, "A Tractable Class of Algorithms for Reliable Routing in Stochastic Networks", *Procedia Social and Behavioral Sciences*, 2011, pp. 341-363, vol. 17, Elsevier, Ltd., U.K.

International Searching Authority, International Search Report and Written Opinion for International Application No. PCT/EP2017/067435, dated Oct. 20, 2017, 13 pages, European Patent Office, Netherlands.

United States Patent and Trademark Office, Office Action for U.S. Appl. No. 15/210,166, dated Aug. 24, 2017, USA.

United States Patent and Trademark Office, Office Action for U.S. Appl. No. 15/210,166, dated Feb. 16, 2018, USA.

United States Patent and Trademark Office, Notice of Allowance for U.S. Appl. No. 15/210,166, dated May 8, 2018, USA.

MAP HAVING COMPUTER EXECUTABLE INSTRUCTIONS EMBEDDED THEREIN

CROSS-REFERENCE TO RELATED APPLICATIONS

This application is a continuation of U.S. application Ser. No. 15/210,166, filed Jul. 14, 2016, the content of which is hereby incorporated in its entirety by reference.

TECHNOLOGICAL FIELD

Example embodiments relate generally to updating a digital map. In particular, example embodiments generally relate to a digital map having computer-executable instructions embedded therein.

BACKGROUND

Consumer vehicles are capable of capturing high-volume, detailed, on-board road sensor data. For example, consumer vehicles may capture a high-volume of detailed, on-board road sensor data that may be used for assisted and/or autonomous driving. Unfortunately, most of this detailed data is generally thrown away; with only a minimal amount of information broadcast or stored for later use. The data is typically too voluminous to store or transmit; and may be discarded for privacy issues. Thus, a large volume of information collected by consumer vehicles is discarded and not available for off-board processing; therefore, potential map learning suffers due to privacy and transmission limitations.

BRIEF SUMMARY

Example embodiments allow for the detailed, on-board road sensor data captured by consumer vehicles to be used to inform updated based on the high-volume, without requiring a large volume of data transmission and without raising privacy issues. For example, an on-board vehicle apparatus may receive and/or store a digital map (or one or more map tiles thereof). At least one link data record of the digital map may have embedded therein computer-executable instructions. The on-board vehicle apparatus may then execute the computer-executable instructions, causing the processing and/or analysis of on-board road sensor information/data captured as the vehicle traveled along a road segment represented in the digital map by the link corresponding to the link data record. A response indicating the result of the processing and/or analysis of the sensor information/data may be provided to an update apparatus. The update apparatus may receive a plurality of responses from a plurality of on-board vehicle apparatuses. The plurality of indications may be analyzed and the digital map may be updated based thereon. In example embodiments, the embedded computer-executable instructions may be updated. Thus, the digital map may be updated based on analysis of the on-board road sensor information/data without requiring a large volume of data to be transmitted and without raising privacy concerns. In example embodiments, the map may be updated in real- or near real-time based on the received responses.

Methods, apparatus, and computer program products are provided in accordance with an example embodiment in order to update a map based on on-board road sensor information/data. In example embodiments, a record for a particular traversable map element is accessed. The record comprises an executable instruction. Sensor data from one or more sensors is received. The sensor data corresponds to the particular traversable map element. The executable instruction is executed by a processor. Executing the executable instruction causes analysis of at least a portion of the sensor data.

In accordance with an example embodiment, a method is provided. The method comprises accessing a record for a particular traversable map element. The record comprises an executable instruction. The method further comprises receiving sensor data from one or more sensors. The sensor data corresponds to the particular traversable map element. The method further comprises executing the executable instruction by a processor. Executing the executable instruction causes analysis of at least a portion of the sensor data.

In example embodiments, executing the executable instructions causes analysis of (a) at least a portion of second sensor data corresponding to a second particular traversable map element or (b) a combination of at least a portion of the second sensor data and at least a portion of the sensor data. In example embodiments, the second particular traversable map element may (immediately) proceed or succeed the particular map element. In example embodiments, execution of the executable instructions is influenced by at least one of vehicle type, vehicle make/model, time of day, the road segment immediately previously traversed by the vehicle, or the vehicle route. In example embodiments, executing the executable instruction further causes transmission of an indication of the result of analyzing the at least a portion of the sensor data. In an example embodiment the executable instruction comprises at least one of a minimum reporting threshold and a maximum reporting threshold, and the method further comprises: determining if a result of analyzing the at least a portion of the sensor data is greater than the minimum reporting threshold, less than the maximum reporting threshold, or both; and if the result is greater than the minimum reporting threshold, less than the maximum reporting threshold, or both, transmitting an indication of the result of analyzing the at least a portion of the sensor data.

In an example embodiment the executable instruction comprises an instruction to access a particular record of a function repository. In an example embodiment, the particular record comprises an algorithm in a computer executable format. In an example embodiment, the executable instruction comprises one or more parameters for use with the algorithm. In an example embodiment, the function repository provides different executable instructions to the vehicle based on the rules or conventions of the country or political region that the vehicle is located in.

In an example embodiment, the sensor data is collected by the one or more sensors as a vehicle traverses a road element represented by the particular traversable map element. In an example embodiment, the processor and the one or more sensors are on-board the vehicle.

In an example embodiment, the executable instruction comprises one or more parameters for use with a factory programmed algorithm.

In accordance with an example embodiment, an apparatus is provided. The apparatus comprises at least one processor and at least one memory storing computer program code. The at least one memory and the computer program code configured to, with the processor, cause the apparatus to at least access a record for a particular traversable map element. The record (a) comprises an executable instruction and (b) is stored in the at least one memory. The at least one memory and the computer program code are further configured to, with the processor, cause the apparatus to at least receive sensor data from one or more sensors. The sensor data corresponds to the particular traversable map element.

The at least one memory and the computer program code are further configured to, with the processor, cause the apparatus to at least execute, by the processor, the executable instruction. Executing the executable instruction causes analysis of at least a portion of the sensor data.

In example embodiments, executing the executable instructions causes analysis of (a) at least a portion of second sensor data corresponding to a second particular traversable map element or (b) a combination of at least a portion of the second sensor data and at least a portion of the sensor data. In example embodiments, the second particular traversable map element may (immediately) proceed or succeed the particular map element. In example embodiments, execution of the executable instructions is influenced by at least one of vehicle type, vehicle make/model, time of day, the road segment immediately previously traversed by the vehicle, or the vehicle route. In example embodiments, executing the executable instruction further causes transmission of an indication of the result of analyzing the at least a portion of the sensor data. In an example embodiment the executable instruction comprises at least one of a minimum reporting threshold and a maximum reporting threshold, and the at least one memory and the computer program code are further configured to, with the processor, cause the apparatus to at least determine if a result of analyzing the at least a portion of the sensor data is greater than the minimum reporting threshold, less than the maximum reporting threshold, or both; and if the result is greater than the minimum reporting threshold, less than the maximum reporting threshold, or both, transmit an indication of the result of analyzing the at least a portion of the sensor data.

In an example embodiment the executable instruction comprises an instruction to access a particular record of a function repository. In an example embodiment, the particular record comprises an algorithm in a computer executable format. In an example embodiment, the executable instruction comprises one or more parameters for use with the algorithm. In an example embodiment, the function repository provides different executable instructions to the vehicle based on the rules or conventions of the country or political region that the vehicle is located in.

In an example embodiment, the sensor data is collected by the one or more sensors as a vehicle traverses a road element represented by the particular traversable map element. In an example embodiment, the processor and the one or more sensors are on-board the vehicle.

In an example embodiment, the executable instruction comprises one or more parameters for use with a factory programmed algorithm.

In accordance with an example embodiment, a computer program product is provided. The computer program product comprises at least one non-transitory computer-readable storage medium having computer-executable program code instructions stored therein. The computer-executable program code instructions comprising program code instructions configured to access a record for a particular traversable map element. The record comprises an executable instruction. The computer-executable program code instructions further comprise program code instructions configured to receive sensor data from one or more sensors. The sensor data corresponds to the particular traversable map element. The computer-executable program code instructions further comprise program code instructions configured to cause execution, by a processor, of the executable instruction. Executing the executable instruction causes analysis of at least a portion of the sensor data.

In example embodiments, executing the executable instructions causes analysis of (a) at least a portion of second sensor data corresponding to a second particular traversable map element or (b) a combination of at least a portion of the second sensor data and at least a portion of the sensor data. In example embodiments, the second particular traversable map element may (immediately) proceed or succeed the particular map element. In example embodiments, execution of the executable instructions is influenced by at least one of vehicle type, vehicle make/model, time of day, the road segment immediately previously traversed by the vehicle, or the vehicle route. In example embodiments, executing the executable instruction further causes transmission of an indication of the result of analyzing the at least a portion of the sensor data. In an example embodiment the executable instruction comprises at least one of a minimum reporting threshold and a maximum reporting threshold, and the computer-executable program code instructions further comprise program code instructions configured to determine if a result of analyzing the at least a portion of the sensor data is greater than the minimum reporting threshold, less than the maximum reporting threshold, or both; and if the result is greater than the minimum reporting threshold, less than the maximum reporting threshold, or both, transmit an indication of the result of analyzing the at least a portion of the sensor data.

In an example embodiment the executable instruction comprises an instruction to access a particular record of a function repository. In an example embodiment, the particular record comprises an algorithm in a computer executable format. In an example embodiment, the executable instruction comprises one or more parameters for use with the algorithm. In an example embodiment, the function repository provides different executable instructions to the vehicle based on the rules or conventions of the country or political region that the vehicle is located in.

In an example embodiment, the sensor data is collected by the one or more sensors as a vehicle traverses a road element represented by the particular traversable map element. In an example embodiment, the processor and the one or more sensors are on-board the vehicle.

In an example embodiment, the executable instruction comprises one or more parameters for use with a factory programmed algorithm.

In accordance with yet another example embodiment of the present invention, an apparatus is provided. The apparatus comprises means for accessing a record for a particular traversable map element. The record comprises an executable instruction. The apparatus further comprises means for receiving sensor data from one or more sensors. The sensor data corresponds to the particular traversable map element. The apparatus further comprises means for executing the executable instruction by a processor. Executing the executable instruction causes analysis of at least a portion of the sensor data.

In accordance with still another aspect of the present invention, methods, apparatus, and computer program products are provided in accordance with an example embodiment in order to update a map based on on-board road sensor information/data. In example embodiments, a first map tile is provided. The first map tile comprises a record for a particular traversable map element. The record has executable instructions embedded therein. One or more responses are received based on execution of the executable instructions. The one or more responses are analyzed and one or more map databases may be updated based on a result of the analysis. The executable instructions may be updated, based at least in part on the one or more responses and/or the analysis thereof, to generate a second map tile. The second map tile comprises the record having the updated executable instructions embedded therein. The second map tile may be provided. One or more second responses may be received based at least in part on execution of the updated executable instructions.

In accordance with another aspect of the present invention, a system is provided. In example embodiments, the system comprises a plurality of vehicle apparatuses and an update apparatus. Each of the plurality of vehicle apparatuses comprise at least one first processor and at least one first memory storing computer program code. The at least one first memory and the computer program code are configured to, with the first processor, cause the vehicle apparatus to at least access a record for a particular traversable map element. The record (a) comprises an executable instruction and (b) is stored in the at least one first memory. The at least one first memory and the computer program code are further configured to, with the first processor, cause the vehicle apparatus to at least receive sensor data from one or more sensors. The sensor data corresponding to the particular traversable map element. The at least one first memory and the computer program code are further configured to, with the first processor, cause the vehicle apparatus to to at least execute, by the first processor, the executable instruction. Executing the executable instruction causes analysis of at least a portion of the sensor data. In example embodiments, execution of the executable instructions may cause the vehicle apparatus to provide a response based at least in part on the analysis of the sensor data. The update apparatus comprises at least one second processor and at least one second memory storing computer program code. The at least one second memory and the computer program code are configured to, with the second processor, cause the apparatus to at least provide a first map tile comprising the record for the particular traversable map element to a first set of vehicle apparatuses of the plurality of vehicle apparatuses. The at least one second memory and the computer program code are further configured to, with the second processor, cause the apparatus to at least receive one or more responses from at least one vehicle apparatus of the first set of vehicle apparatuses. The at least one second memory and the computer program code are further configured to, with the second processor, cause the apparatus to at least update the executable instruction, based at least in part on the one or more responses, to generate a second map tile. The at least one second memory and the computer program code are further configured to, with the second processor, cause the apparatus to at least provide the second map tile to a second set of vehicle apparatuses of the plurality of vehicle apparatuses.

BRIEF DESCRIPTION OF THE DRAWINGS

Having thus described certain example embodiments in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide map updates for a tiled map. For example, the map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population density within the map region, and/or the like. Example embodiments provide a digital map comprising a plurality of map tiles, wherein at least one map tile comprises a data record (e.g., a link data record, node data record, and/or the like) comprising computer-executable instructions. The computer-executable instructions may comprise at least one of computer-executable instructions for analyzing at least a portion of sensor information/data, vehicle state data (e.g., vehicle type, vehicle make/model, time of day, and/or the like), a reference to a function repository that comprises computer-executable instructions, one or more coefficients and/or parameters to be used in accordance with an algorithm for performing the analysis, one or more response criteria for providing a response indicating a result of the analysis, and/or the like, as described in more detail below. For example, a map road link A-1234_v1, in tile A_v1, might contain embedded instructions for capturing the road width for the specific link. The instructions might indicate further execution is initiated only when certain sensor criteria is observed. For example, the embedded computer-readable instructions may indicate that an analysis of the sensor data is to be performed by the vehicle apparatus when the corresponding vehicle is traveling along a road segment corresponding to link A-1234 with a velocity $<N_1$ KPH, a radar distance to the right barrier $<N_2$ meters, and a measured GPS position with quality $>N_3$, where $N_1$ $N_2$, and $N_3$ are a predefined velocity, distance, and quality, respectively. Instead of returning all sensor data (perhaps noisy), the computer instructions are followed to compute a single road width result. For example, the sensor data may include three indicators of the road width based on measurements captured by three different sensors. The instructions might combine the distance of sensor C with Sensor's D and E such as: Width=2C+(D/C+0.75E), for example. In another example, the instructions may indicate that the sensor data is averaged over a 20 meter travel distance along the road segment corresponding to link A-1234 in order to reduce noise in the measurement. On the back end, the transmitted width results for the link are collected by the update apparatus. Analysis of the returned data might show that the algorithm results were too noisy; therefore, a new map tile (A_v2) is created with modified computer instructions embedded into the road link (A-1234_v2). The new instructions may indicate that the sensor data should be averaged over 50 meters of travel distance before returning the computed road width value. $N_2$ may also be reduced. The new map tile is made immediately available to vehicles approaching the region. Further vehicles traversing link A-1234 may now combine the sensor data into a more desirable manner, due to the dynamically modified computer-readable instructions embedded into the road link within the map tile.

In example embodiments, an update apparatus may provide one or more map tiles having computer-executable instructions embedded therein. For example, the computer-executable instructions may be embedded into a link data record, intersection or node data record, point of interest (POI) data record, or other data record of at least one of the one or more map tiles). In example embodiments, the computer-executable instructions may be configured to cause analysis of sensor information/data and the provision of a result of the analysis. A vehicle apparatus may receive and store the one or more map tiles having computer-executable instructions embedded therein. The vehicle apparatus may be on-board a vehicle that traverses a link, node, is in the vicinity of a POI, and/or the like (collectively referred to herein as traversable map elements) for which the corresponding data record has computer-executable instructions embedded therein. The vehicle apparatus may receive sensor information/data gathered by one or more sensors on-board the vehicle and execute the computer-executable instructions to analyze the sensor information/data and provide a result of the analysis. In some embodiments, computer-readable instructions embedded in a first link and/or results and/or sensor data from the first link may be used during the analysis of the one or more succeeding links. For example, the embedded instruction may indicate which particular sensor data to use in the one or more succeeding links, how to carry the particular sensor data forward into the one or more succeeding links (e.g., the next n links), how to use the particular sensor data in the data analysis of the sensor data for the one or more succeeding links, and/or the like. The instructions may only allow carrying over sensor data from the first link to one or more succeeding links for specific link combinations. In addition, the vehicle route might be used within the analysis of the sensor data. For example, the analysis of the sensor data corresponding to link C might only occur when traversing to the road segment corresponding to link C from the road segment corresponding to link A. The analysis of the sensor data corresponding to link C may not be performed or reported when traversing from the road segment corresponding to link B to the road segment corresponding to link C. In another example, the computer-readable instructions may indicate that a particular data analysis should only performed when traversing an intersection with a predefined link connection angle or range of link connection angles (e.g., less than 45 degrees, 45 degrees to 90 degrees, greater than 90 degrees, and/or the like). The update apparatus may then receive the result of the analysis and may update the map based thereon. For the sake of clarity, example embodiments will be described below with respect to computer-executable instructions embedded into a link data record corresponding to a particular link. However, as one of ordinary skill in the art should understand, computer-executable instructions may be embedded into a link data record, node data record, POI data record, or other data record.

Figure 1:
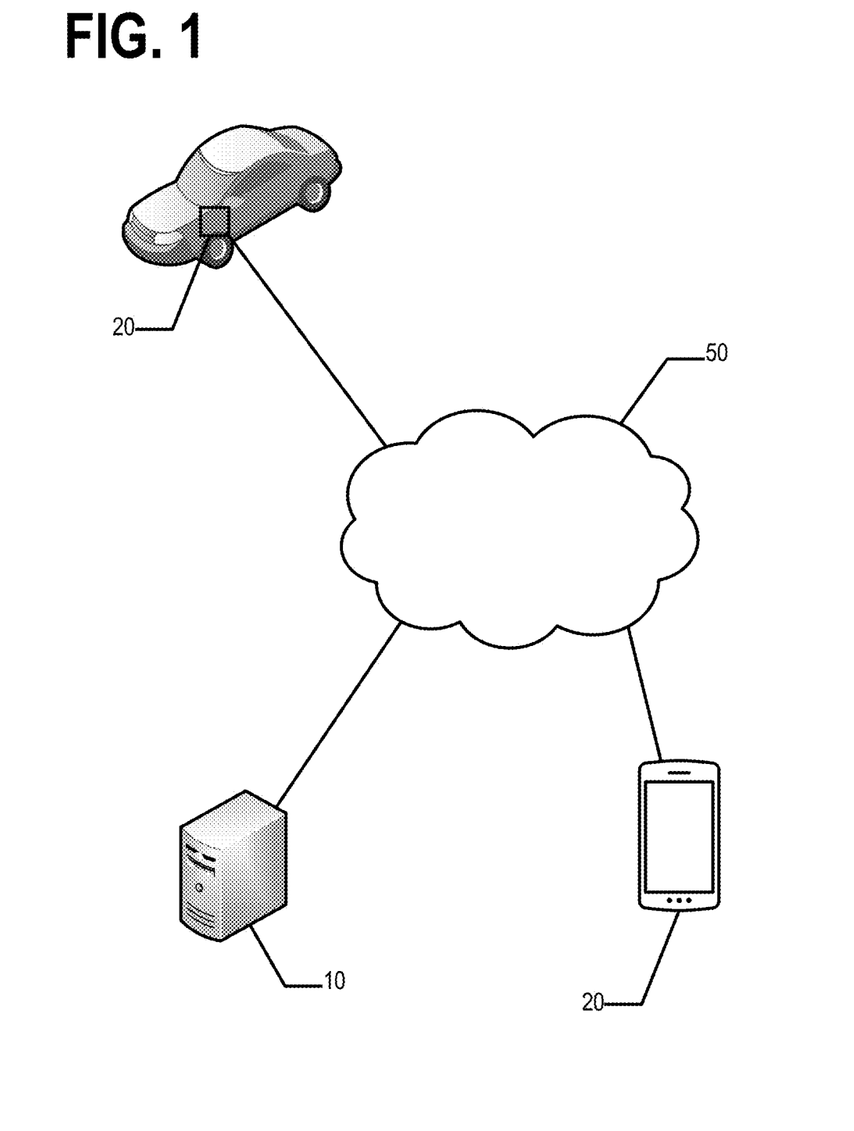
FIG. 1 is a block diagram showing an example architecture of one embodiment of the present invention.

FIG. 1 provides an illustration of an example system that can be used in conjunction with various embodiments of the present invention. As shown in FIG. 1, the system may include one or more vehicle apparatuses 20, one or more update apparatuses 10, one or more networks 50, and/or the like. In various embodiments, the vehicle apparatus 20 may be an in vehicle navigation system, vehicle control system, a mobile computing device, and/or the like. For example, a vehicle apparatus 20 may be an in vehicle navigation system mounted within and/or be on-board a vehicle such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle, assist in control of a vehicle, and/or the like.

Figure 2A:
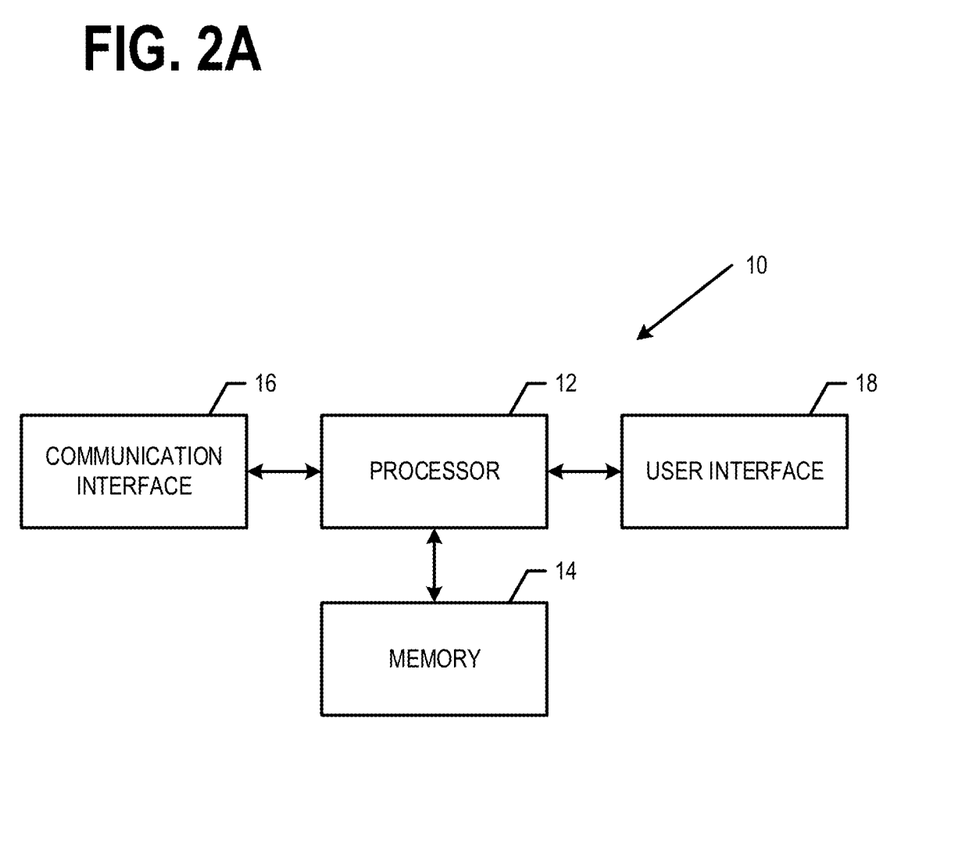
FIG. 2A is a block diagram of an update apparatus that may be specifically configured in accordance with an example embodiment.

In example embodiments, an update apparatus 10 may comprise components similar to those shown in the example update apparatus 10 diagrammed in FIG. 2A. In example embodiments, a vehicle apparatus 20 may comprise components similar to those shown in the example vehicle apparatus 20 diagrammed in FIG. 2B. In various embodiments, the update apparatus 10 may be located remotely from the vehicle apparatus 20. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 may be in communication with an update apparatus 10 via the network 50. For example, the vehicle apparatus 20 may communicate with the update apparatus 10 via the Cloud.

Figure 2B:
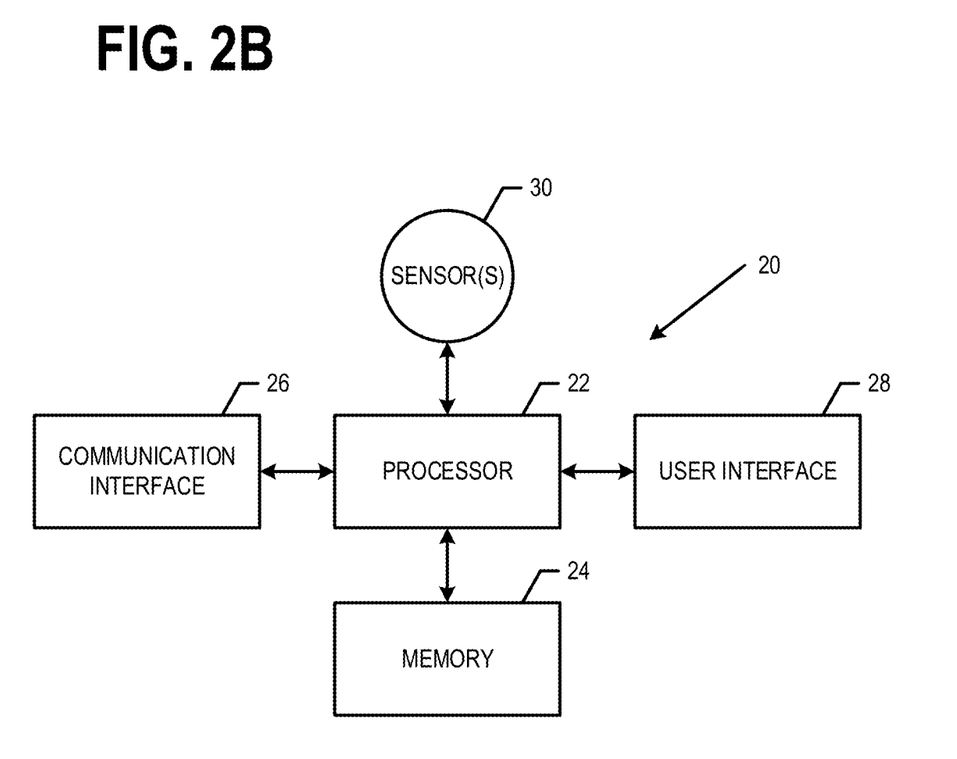
FIG. 2B is a block diagram of an vehicle apparatus that may be specifically configured in accordance with an example embodiment.

In example embodiments, as shown in FIG. 2B, the vehicle apparatus 20 may comprise a processor 22, memory 24, a communications interface 26, a user interface 28, one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus to determine one or more features of the corresponding vehicle's surroundings), and/ or other components configured to perform various operations, procedures, functions or the like described herein. Similarly, as shown in FIG. 2A, the update apparatus 10 may comprise a processor 12, memory 14, a user interface 18, a communications interface 16, and/or other components configured to perform various operations, procedures, functions or the like described herein. Example embodiments of the vehicle apparatus 20 and the update apparatus 10 are described in more detail below with respect to FIGS. 2A and 2B.

II. Exemplary Operation

In example embodiments, the update apparatus 10 may provide one or more map tiles having computer-executable instructions embedded therein. For example, one or more link data records of a map tile may have computer-executable instructions embedded therein. A vehicle apparatus 20 may receive and store the one or more map tiles. The vehicle apparatus 20 may be on-board a vehicle that travels along a particular link corresponding to a link data record having computer-executable instructions embedded therein. As the vehicle travels along the particular link one or more sensors 30 associated with and/or in communication with the vehicle apparatus 20 gather, capture, record, and/or measure sensor information/data. The vehicle apparatus 20 executes the computer-executable instructions, causing the vehicle apparatus 20 to analyze at least a portion of the sensor information/data. In some embodiments, the computer-executable instructions may cause a result of the analysis of the sensor information/data to be provided by the vehicle apparatus 20 to the update apparatus 10. The update apparatus 10 may receive and analyze a plurality of responses, each comprising a result of analyzing sensor information/data corresponding to the particular link. In various embodiments, the update apparatus 10 may update one or more map tiles based on the plurality of responses and/or the analysis thereof. Updating the one or more map tiles may comprise updating one or more link attributes corresponding to the particular link, updating computer-executable instructions embedded in the link data record corresponding to the particular link, and/or the like.

Providing a Map Having Computer-Executable Instructions Embedded Therein

Figure 3:
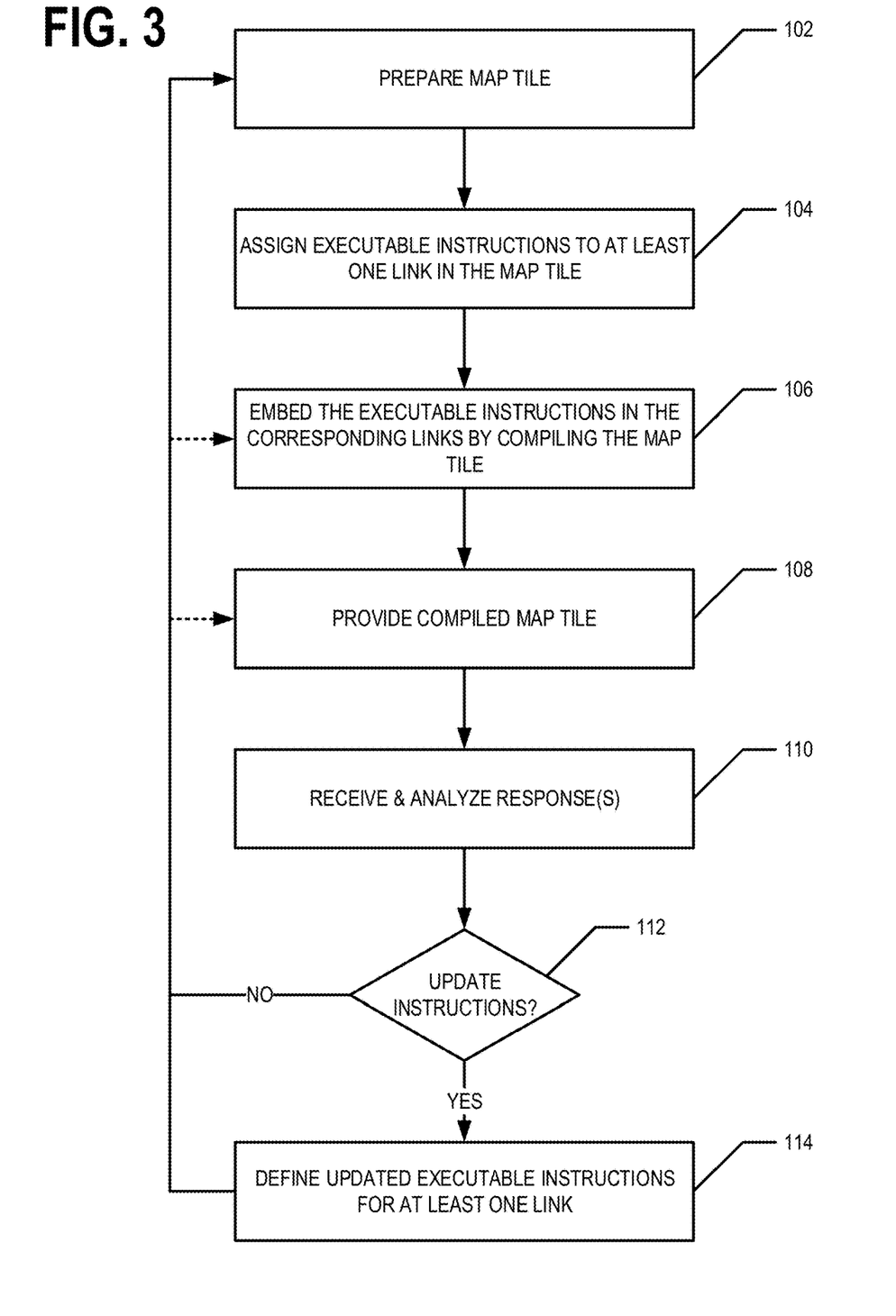
FIG. 3 is a flowchart illustrating operations performed, such as by the update apparatus of FIG. 2A, in accordance with an example embodiment.

FIG. 3 provides a flowchart of operations performed by the update apparatus 10 to provide a map having computer-executable instructions embedded therein, according to example embodiments. For example, a map tile may be prepared. For example, the map tile may be updated from a previous version of the map or otherwise prepared for being provided to one or more vehicle apparatuses 20. Computer-executable instructions may be assigned to one or more particular links within the map tile. The map tile may be compiled to embed the computer-executable instructions therein. The update apparatus 10 may then provide the map tile to one or more vehicle apparatuses 20. In response to the vehicle apparatuses 20 executing the computer-executable instructions embedded into the link data record corresponding to a particular link, the update apparatus 10 may receive a plurality of responses. Each of the plurality of responses may indicate a result of the analysis of the sensor information/data caused by the execution of the computer-executable instructions by a vehicle apparatus 20. The update apparatus 10 may analyze at least a portion of the plurality of responses and update a map tile and/or the computer-executable instructions embedded therein based on the analysis of the at least a portion of the responses. The map tile might consist of links for navigation, vehicles, pedestrians, rail, shipping, bikes, airplanes, etc. For example, the sensor data to be analyzed could relate to automobile, bicycle, pedestrian, ski, train or other types of travel. For example, the travel may include indoor travel (e.g., within a mall) or travel within another bounded area (e.g., an outdoor amusement park). Thus, the map data may relate to a wide variety of types of navigational maps.

Starting at block 102, a map tile is prepared. For example, the update apparatus 10 may prepare a map tile. For example, the update apparatus 10 may comprise means, such as processor 12 and/or the like, for preparing a map tile. In some embodiments, the map tile may be updated from a previous version of the map based on various map information/data. For example, the map tile may be prepared for being provided to one or more vehicle apparatuses 20.

At block 104, computer-executable instructions may be assigned to one or more links in the map tile. For example, the update apparatus 10 may assign computer-executable instructions to one or more links in the map tile. For example, the update apparatus 10 may comprise means, such as processor 12 and/or the like, for assigning computer-executable instructions to one or more links in the map tile. For example, the computer-executable instructions may provide instructions regarding how sensor information/data is to be analyzed. For example, the computer-executable instructions may indicate which sensor information/data is to be used in the analysis, provide one or more algorithms or functions for performing the analysis, provide one or more coefficients and/or parameters to be used in accordance with an algorithm for performing the analysis, one or more guidelines for providing a response indicating a result of the analysis, and/or the like. In example embodiments, the computer-executable instructions may be in accordance with a standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm. In some embodiments, the computer-executable instructions may indicate that the sensor data may be analyzed differently based on the vehicle type, vehicle make/model, time of day, road segment (immediately) previously traversed, vehicle route (e.g., the order in which road segments are traversed), and/or the like. For example, some the sensor arrangement of a particular type of vehicle or make/model may be known to capture higher quality sensor information/data of a particular type or that is particularly useful for a certain type of analysis. Thus, vehicles of the particular type or make/model may be asked to analyze the sensor data corresponding to a link differently and/or more often than other vehicles. Similarly, some sensors may perform better in daylight conditions, night time driving conditions, various other lighting conditions, and/or the like. In another example, the analysis performed by a vehicle that travels along a road segment corresponding to a first link forward onto the road segment corresponding to a second link may perform a different analysis than a vehicle that travels along a road segment corresponding to the first link and then turns onto a road segment corresponding to a third link. In another example, a different analysis of the sensor data may be performed if the previous road segment traveled by a vehicle was an on-ramp onto a highway or a road segment on the highway.

In some embodiments, the computer-executable instructions may comprise a reporting criteria (e.g., computer-executable instructions indicating when a response should or should not be provided). For example, the reporting criteria portion of the computer-executable instructions may cause the providing of a response in certain situations, but not in other situations. For example, the reporting criteria may cause a response to be provided by every car, every tenth car, every one hundredth car, or the like that the compiled map tile is provided to, responses to be provided only if the particular link is traversed during a particular time of day (e.g., during rush hour, during an even hour, and/or the like), if the result of the analysis of the sensor information/data is a particular result and/or greater/less than a threshold result value. Thus, the computer-executable instructions embedded in the link data record of a particular link may cause the sensor information/data corresponding to the particular link to be analyzed in a particular manner and may cause or prevent the reporting of the result of the analysis based on the result or other factors.

At block 106, the map tile is compiled to embed the computer-executable instructions into the link data record(s) corresponding to the assigned link(s). For example, the update apparatus 10 may compile the map tile to embed the computer-executable instructions into the link data record(s) corresponding to the assigned link(s). For example, the update apparatus 10 may comprise means, such as the processor 12 and/or the like, for compiling the map tile to embed the computer-executable instructions into the link data record(s) corresponding to the assigned link(s). For example, the map tile may be compiled. During the compilation process, the computer-executable instructions assigned to a particular link may be embedded into link data record corresponding to the particular link.

At block 108, the compiled map tile is provided. For example, the compiled map tile may be provided or transmitted to one or more vehicle apparatuses 20. For example, the update apparatus 10 may provide the compiled map tile. For example, the update apparatus 10 may comprise means, such as the processor 12, communications interface 16, and/or the like, for providing the compiled map tile. For example, the compiled map tile may be provided and/or transmitted to a plurality of vehicle apparatuses 20 through a network 50.

At block 110, one or more responses may be received and analyzed. For example, the update apparatus 10 may receive and analyze one or more responses. For example, the update apparatus 10 may comprise means, such as processor 12, communications interface 16, and/or the like, for receiving and analyzing one or more responses. For example, a response may be provided and/or transmitted by a vehicle apparatus 20, though, for example, network 50. In example embodiments, the one or more responses may be analyzed after at least a pre-determined number of responses are received, responses have been received for at least a pre-determined amount of time, a pre-determined time window for receiving responses has expired, and/or the like. In example embodiments, the one or more responses may be analyzed individually, in subsets (e.g., corresponding to a particular time of day, time of the week, type of vehicle, and/or the like), or as a whole.

In example embodiments, a response may comprise an indication of a result of the analysis of sensor information/data that was caused by execution of the computer-executable instructions embedded in a map tile. For example, a vehicle apparatus 20 may travel along a road segment represented in the map by a particular link wherein the corresponding link record has computer-executable instructions embedded therein. The vehicle apparatus 20 (e.g., the processor 22) may then execute the computer-executable instructions to analyze the sensor information/data collected, captured, recorded, and/or measured by the one or more sensors 30 as the vehicle apparatus 20 traversed the road segment represented by the particular link. The vehicle apparatus 20 may then provide a response indicating a result of the analysis of the sensor information/data and the update apparatus 10 may receive the response. For example, execution of the computer-executable instructions may cause the vehicle apparatus 20 to use sensor information/data from, for example, three of the sensors 30 to determine if there is a wall or guard rail along the side of the road segment or a portion thereof for the particular link. The response may then comprise a link identifier configured to identify the particular link and an indication of the determination of whether a wall or guard rail is present along the road segment or a portion thereof represented by the particular link.

In example embodiments, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the update apparatus 10 may determine and assign computer-executable instructions that are adapted for particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular links may be adapted or optimized for a particular vehicle type, make, model, trim package, year, and/or the like and/or a particular sensor configuration associated with the vehicle apparatus 20.

In example embodiments, the one or more responses may be analyzed. For example, a plurality of responses may be received (e.g., by the update apparatus 10). The plurality of responses may be binned by the result of the analysis caused by the execution of the computer-executable instructions. For example, if the responses indicate that a wall or guard rail is or is not present along the road segment of the particular link, it may be determined what percentage or fraction of the responses indicate that a wall or guard rail is present and what percentage or fraction of the responses indicate that a wall or guard rail is not present.

At block 112, it may be determined if the computer-executable instructions for the particular link should be updated. For example, the update apparatus 10 may determine if the computer-executable instructions for the particular link should be updated. For example, the update apparatus 10 may comprise means, such as processor 12 and/or the like, to determine if the computer-executable instructions for the particular link should be updated. For example, if the analysis of the responses show that 90% of the responses indicate that there is a wall or guard rail, for example, along the road segment corresponding to a particular link, 9% of the responses indicate that there is not a wall or guard rail along the road segment corresponding to the particular link, and 1% of the responses indicated that it could not be determined if a wall or guard rail was or was not present along the road segment corresponding to the particular link, it may be determined (e.g., by the update apparatus 10) that a wall or guard rail is present along the road segment corresponding to the particular link and it may be desired to update the computer-executable instructions embedded in the link data record for the particular link to investigate another attribute of the particular link and/or to prevent or reduce the number of vehicle apparatuses 20 providing or transmitting responses related to the particular link. If the map tile (e.g., comprising the link data record corresponding to the particular link) did not indicate that a wall or guard rail, for example, was present along the particular link, the map tile (e.g., the link data record corresponding to the particular link) may be updated to indicate the presence of the wall or guard rail when a new version of the map tile is prepared. For example, one or more link attributes of the particular link may be updated in one or more map databases based on the analysis of the responses corresponding to the particular link. In another example, if the analysis of the responses indicates that a particular response has been received, the embedded computer-readable instructions may be updated to focus the attention of vehicles and their sensors 30 on a different attribute of the particular link. For example, if analysis of the responses indicate that a particular attribute of the particular link is known within a predetermined or dynamically defined level of confidence, the embedded computer-readable instructions may be updated such that another attribute of the link may be determined. For example, if, based on the analysis of the responses, a first attribute is known within a particular level of confidence, the executable-instructions may be updated to determine a second attribute that is not known within a particular level of confidence or which has not been recently updated (e.g., to check if a previously determined value for the second attribute is still appropriate).

If, at block 112, it is determined that the computer-executable instructions for the particular link are not to be updated, the process may return to blocks 102 or 108, as appropriate for the situation. For example, if a new version of the map tile is being prepared, the process may return to block 102 to prepare the new map tile for compilation. If a new version of the map tile is not being prepared, the process may return to block 108 to continue providing the compiled map tile such that additional responses may be received.

If, at block 112, it is determined that the computer-executable instructions for the particular link are to be updated, the process continues to block 114. At block 114, updated computer-executable instructions for the particular link may be determined and/or defined and assigned to the particular link. For example, the update apparatus 10 may determine and/or define updated computer-executable instructions for the particular link and assign the updated computer-executable instructions to the particular link. For example, the update apparatus 10 may comprise means, such as processor 12 and/or the like, for determining and/or defining updated computer-executable instructions for the particular link and assigning the updated computer-executable instructions to the particular link. For example, the updated computer-executable instructions may be new computer-executable instructions; a different function, algorithm, set of coefficients and/or parameters; a reference to a different set of instructions, function, or algorithm in the function repository; new reporting criteria; and/or the like. In example embodiments, the computer-readable instructions may be updated based at least in part on the received responses and/or the analysis thereof. For example, if it is determined that a first link attribute is now known with a particular level of confidence (e.g., based on the analysis of received responses), the computer-readable instructions may be updated to no longer cause the vehicle apparatuses 20 to determine a value for the first link attribute and to now determine a value for a second link attribute. If a new version of the map tile is being prepared, the process may return to block 102 to prepare the new map tile for compilation. If a new version of the map tile is not being prepared, the process may return to block 106 such that the map tile may be compiled to embed the updated computer-executable instructions into the map tile.

Using a Map Having Computer-Executable Instructions Embedded Therein

Figure 4:
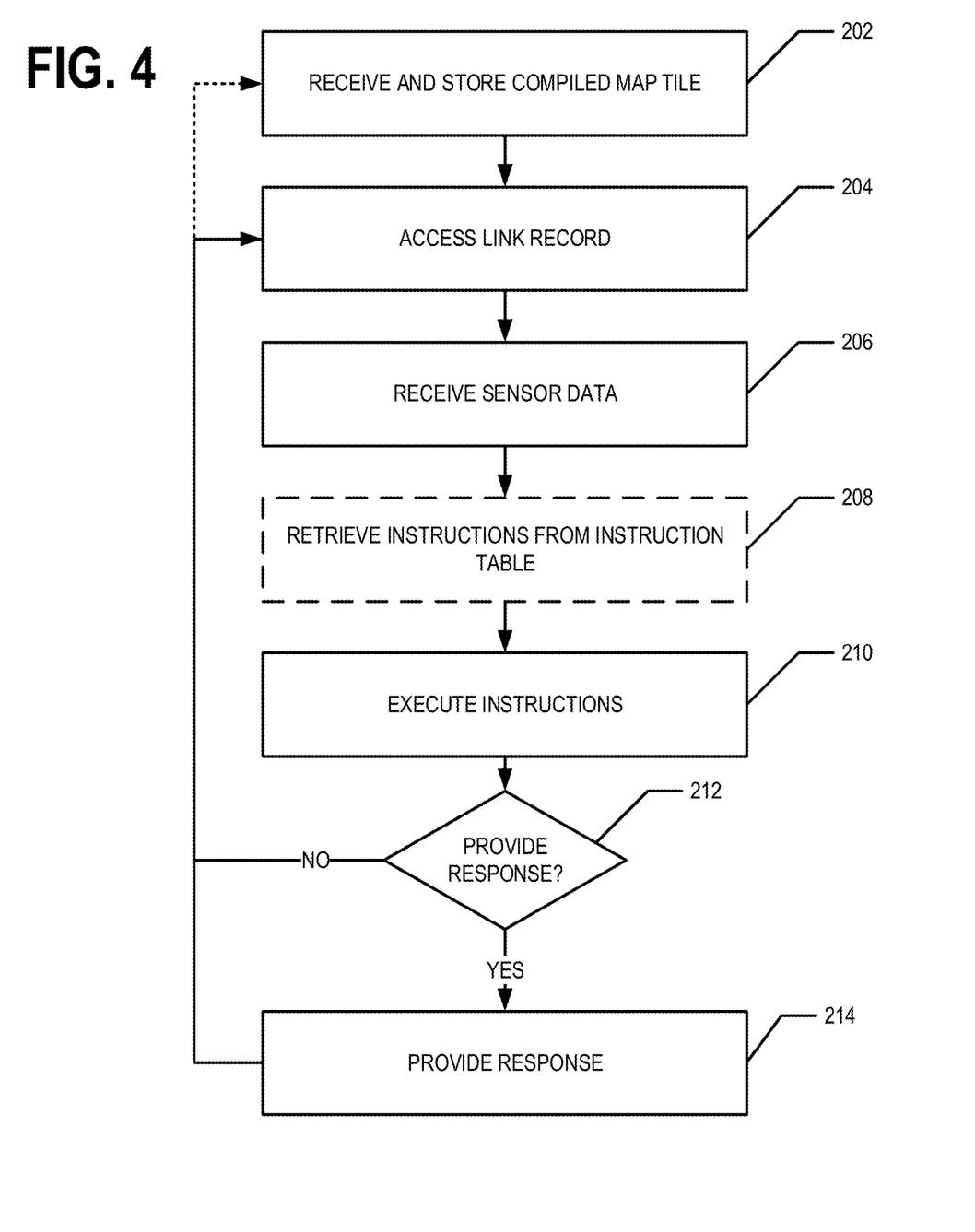
FIG. 4 is a flowchart illustrating operations performed, such as by the vehicle apparatus of FIG. 2B, in accordance with an example embodiment.

FIG. 4 provides a flowchart of operations performed by a vehicle apparatus 20 using a map (e.g., a digital map) having computer-executable instructions embedded therein, according to an example embodiment. In example embodiments, the vehicle apparatus 20 may receive a map tile having computer-executable instructions embedded therein. For example, computer-executable instructions may be embedded in one or more link data records each corresponding to a particular link in the map tile. When the vehicle apparatus 20, on-board a vehicle, traverses a road segment corresponding to one of the particular links, the computer-executable instructions embedded in the corresponding link data record are accessed and executed, causing analysis of sensor information/data collected, captured, gathered, measured, and/or the like by the one or more sensors 30 as the vehicle traversed the road segment represented by the particular link. The computer-executable instructions may further cause or prevent the vehicle apparatus 20 from providing or transmitting a response indicating the result of the analysis of the sensor information/data.

Starting at block 202, a compiled map tile is received and stored. The compiled map tile comprises at least one link data record, corresponding to a link in the map tile, having computer-executable instructions embedded therein. For example, the vehicle apparatus 20 may receive and store a compiled map tile. For example, the vehicle apparatus 20 may comprise means, such as processor 22, memory 24, communications interface 26, and/or the like, for receiving and storing one or more compiled map tiles. In example embodiments, the compiled map tile may be provided by the update apparatus 10. In various embodiments, the vehicle apparatus 20 may be in the vicinity of the geographical area represented by the map tile, following a route or a predicted route that passes through at least a portion of the geographical area represented by the map tile, and/or the like.

At block 204, a link data record corresponding to a particular link may be accessed. For example, the vehicle which the vehicle apparatus 20 is on-board may traverse, be traversing, or be about to traverse a road segment represented by a particular link. For example, the vehicle apparatus 20 may access a link data record corresponding to the particular link. For example, the vehicle apparatus 20 may comprise means, such as processor 22, memory 24, and/or the like, for accessing a link data record corresponding to the particular link. Upon accessing the link data record, it may be determined that the link data record has computer-executable instructions embedded therein. For example, it may be determined that the link data record comprises computer-executable instructions.

At block 206, sensor information/data may be received. For example, as the vehicle traverses the road segment represented by the particular link, the one or more sensors 30 may capture, collect, record, measure, and/or the like sensor information/data. For example, the vehicle apparatus 20 may receive sensor information/data. For example, the vehicle apparatus 20 may comprise means, such as processor 22, communications interface 26, sensors 30, and/or the like, for receiving sensor information/data. For example, the sensor information/data may comprise geolocation information/data, digital image information/data, LiDAR measurement information/data (e.g., distance and/or height information/data corresponding to an object on or on the side of the road segment corresponding to the particular link), time information/data, acceleration information/data, heading information/data, steering wheel reaction information/data, and/or the like. It should be understood that the sensors 30 may comprise various types of sensors configured for collecting, capturing, recording, measuring, and/or the like a variety of sensor information/data, as appropriate for the application. It should be understood that various vehicle types, makes/models, and/or the like may have different combinations of sensors and/or sensors of various qualities. For example, different vehicle types, makes/models, and/or the like may have "expert disciplines." For example, the sensors 30 of Vehicle A may comprise a LiDAR and camera that are better suited for detecting a roadside barrier than the sensors 30 of Vehicle B. Similarly, the camera arrangement of Vehicle B may be better at detecting road paint (e.g., lines, lanes, etc.). Thus, in some embodiments, the computer-readable instructions may include instructions for vehicles of the same type as Vehicle A to perform a first analysis of the sensor data, for vehicles of the same type as Vehicle B to perform a different analysis of the sensor data, and for vehicles of the type as Vehicle C to not perform an analysis of the sensor data.

In some embodiments, the computer-executable instructions may comprise a reference to a function repository stored in association with the map. For example, the function repository may be a reference table, a serialized file, a database, and/or the like. In example embodiments, the computer-executable instructions may comprise a reference to a function repository stored in the association with the map and one or more coefficients or parameters that are to be used in the calculation or determination of the result of the referenced instructions, function(s), or algorithm(s). In such an embodiment, at block 208, the referenced instructions, function(s), and/or algorithm(s) may be retrieved and/or accessed from the function repository. For example, the vehicle apparatus 20 may retrieve and/or access instructions, function(s), and/or algorithm(s) referenced by the computer-executable instructions embedded in the link data record, from the function repository. For example, the vehicle apparatus 20 may comprise means, such as processor 22, memory 24, and/or the like, for retrieving and/or accessing instructions, function(s), and/or algorithm(s) referenced by the computer-executable instructions embedded in the link data record, from the function repository. In some embodiments, the function repository may comprise different instructions based on different road design rules for different countries or geographical or political regions and/or the conventions thereof. In further embodiments, the function repository might consist of different instructions based on the type of vehicle being driven, the time of day, current velocity, and/or the like.

As noted above, in some embodiments, the embedded computer-executable instructions may comprise a reference to an function repository stored in the association with the map and one or more coefficients or parameters that are to be used in the calculation or determination of the result of the referenced instructions, function(s), or algorithm(s). In some example embodiments, the embedded computer-executable instructions may themselves comprise the instructions, function(s), algorithm(s), and/or the like and any associated coefficients and/or parameters for analyzing the sensor information/data. In some example embodiments, the vehicle apparatus 20 (e.g., stored in memory 24) may comprise factory programmed instructions, function(s), algorithm(s), and/or the like that may be defined for global usage (e.g., may not be defined with respect to a particular road segment or link) and the embedded computer-executable instructions may comprise one or more coefficients or parameters that are to be used in the calculation or determination of the result of the factory programmed instructions, function(s), or algorithm(s). For example, the factory programmed instructions, function(s), or algorithm(s) may comprise use of sensor information/data collected, captured, gathered, measured, and/or the like by a first sensor of the one or more sensors 30. However, at the location of the particular link, the first sensor may not function dependably. For example, the first sensor may be a camera and the road segment corresponding to the particular link may be located (at least partially) within a tunnel or other area with poor lighting. Thus, a second sensor, for example a LiDAR sensor, may be more reliable along the road segment corresponding to the particular link and the embedded computer-readable instructions may therefore indicate that the LiDAR information/data corresponding to the particular link should be analyzed rather than (or with greater weight than) the camera information/data corresponding to the particular link. Thus, the embedded computer-executable instructions may cause the vehicle apparatus to analyze the sensor information/data differently along the particular link than is provided for by the factory programmed instructions, function(s), or algorithm(s).

At block 210, the computer-executable instructions are executed to cause analysis of at least a portion of the sensor information/data collected, captured, gathered, measured, and/or the like by the one or more sensors 30 as the vehicle traversed the road segment represented by the particular link. For example, the vehicle apparatus 20 may execute the computer-executable instructions to cause analysis of at least a portion of the sensor information/data. For example, the vehicle apparatus 20 may comprise means, such as the processor 22 and/or the like, for executing the computer-executable instructions to cause analysis of the at least a portion of the sensor information/data. For example, the referenced instructions, function(s), and/or algorithm(s); embedded instructions, function(s), and/or algorithm(s); and/or factory programmed instructions, function(s), and/or algorithm(s) may be executed to analyze at least a portion of the sensor information/data. In various embodiments, the computer-executable instructions may use map attributes (e.g., link attributes from the link data record corresponding to the particular link), possibly in addition to sensor information/data, as input. For example, the computer-executable instructions may be configured to determine if there is a wall or guard rail along the side of the roadway represented by the particular link. For example, the computer-executable instructions may cause the vehicle apparatus to determine if a wall or guard rail is present along the side of the roadway represented by the particular link based on sensor information/data and/or one or more link attributes for the particular link using a particular function, algorithm, and/or other method of determination.

At block 212, it is determined if a response is to be provided. For example, the vehicle apparatus 20 may determine if a response is to be provided, for example, based on the response criteria. For example, the vehicle apparatus 20 may comprise means, such as processor 22 and/or the like, for determining if a response is to be provided. For example, the embedded computer-executable instructions may comprise response criteria (e.g., instructions regarding when a response is to be provided). For example, the computer-executable instructions may indicate that a response should always be sent, a response should never be sent, a response should be sent during a particular time frame (e.g., during rush hour traffic; between 10 and 11 am; if the vehicle associated with the vehicle apparatus 20 is a particular make, model, year, has a particular sensor configuration, and/or the like; if a particular result is obtained; if the result is greater than or less than a threshold result value, wherein the response criteria may comprise a threshold result value; and/or the like).

If at block 212 it is determined that a response is not to be provided, the process may return to block 202 to receive and store a compiled map tile and/or block 204 to access another link record. If at block 212 it is determined that a response is to be provided, the process may continue to block 214.

At block 214, a response is provided. For example, a response may be transmitted through a network 50. For example, the vehicle apparatus 20 may provide a response. For example, the vehicle apparatus 20 may comprise means, such as the processor 22, communications interface 26, and/or the like, for providing a response. In example embodiments, the update apparatus 10 may receive the response.

In example embodiments, a response may comprise an indication of a result of the analysis of sensor information/data that was caused by execution of the computer-executable instructions embedded in the link data record corresponding to the particular link. For example, execution of the computer-executable instructions may cause the vehicle apparatus 20 to use sensor information/data from, for example, three of the sensors 30 to determine if there is a wall or guard rail along the side of the road segment or a portion thereof for the particular link. The response may then comprise a link identifier configured to identify the particular link and an indication of the determination of whether a wall or guard rail is present along the road segment or a portion thereof represented by the particular link.

In example embodiments, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the update apparatus 10 may determine and assign computer-executable instructions that are adapted for particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular links may be adapted or optimized for a particular vehicle type, make, model, trim package, year, and/or the like and/or a particular sensor configuration associated with the vehicle apparatus 20.

In various embodiments, a response may comprise various other information/data associated with the vehicle; vehicle apparatus 20; the result of the analysis caused by the execution of the computer-executable instructions; the result of the analysis caused by factory programmed instructions, functions, or algorithms; and/or the like as indicated and/or caused by the reporting criteria, as appropriate for the application.

III. Example Apparatus

The vehicle apparatus 20 and/or update apparatus 10 of an example embodiment may be embodied by or associated with a variety of computing devices including, for example, such as a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or update apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts an update apparatus 10 and FIG. 2B depicts a vehicle apparatus 20 of an example embodiment that may be embodied by various computing devices including those identified above. As shown, the update apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus to determine one or more features of the corresponding vehicle's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the update apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the update apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The update apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the update apparatus 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the update apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the update apparatus 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor, a location sensor configured for determining the location of the apparatus, a communication interface configured to communicate via at least one network, and at least one memory storing (a) computer program code and (b) a plurality of map element records, the at least one memory and the computer program code configured to, with the processor, cause the apparatus to at least:
   identify, via the location sensor, a location of the apparatus;
   access a record from the plurality of map element records that corresponds to a particular traversable map element, the record comprising (a) an executable instruction and (b) map data corresponding to the particular traversable map element, wherein the particular traversable map element corresponds to the location of the apparatus;
   receive data from hardware components, wherein the hardware components are in communication with the at least one processor; and
   execute the executable instruction with the processor, wherein executing the executable instruction causes (a) at least a portion of the data to be analyzed in accordance with an algorithm encoded by or referenced by the executable instruction and (b) a result of the analysis to be provided via the communication interface.

2. An apparatus according to claim 1 wherein execution of the executable instructions is influenced by at least one of vehicle type, vehicle make/model, time of day, road segment immediately previously traversed by the vehicle, and vehicle route.

3. An apparatus according to claim 1, the executable instruction comprises an instruction to access a particular record of a function repository.

4. An apparatus according to claim 3 wherein the particular record comprises at least one of an algorithm in a computer executable format or one or more parameters for use with the algorithm.

5. A component of an on-board vehicle apparatus comprising:
   a digital map stored on a computer-readable medium, the digital map comprising a first plurality of data records, each of said first plurality of data records representing a corresponding traversable map element,
   wherein at least some of said first plurality of data records further comprise:
      an executable instruction, wherein the executable instruction of a particular data record is executed upon determination that said vehicle apparatus is at a position corresponding to a location of the corresponding map element represented by the particular data record, and further wherein
      said executable instruction is executed by a processor and causes data received from a hardware component to be analyzed in accordance with an algorithm encoded by or referenced by the executable instruction.

6. The component of claim 5 wherein the map elements represented by the plurality of data records are road segments.

7. The component of claim 5 wherein the map elements represented by the plurality of data records are end points of road segments.

8. The component of claim 5, wherein executing the executable instruction further causes transmission of an indication of a result of analyzing the data to a computing apparatus external to the vehicle.

9. The component of claim 5, wherein the executable instruction comprises at least one reporting threshold requirement, and executing the executable instruction further causes, responsive to a determination that a result of analyzing the data satisfies the at least one reporting threshold requirement, transmission of an indication of the result of analyzing the data to a computing apparatus external to the vehicle.

10. A component of a mobile computing apparatus comprising:
   a digital map stored on a computer-readable medium, the digital map comprising a first plurality of data records, each of said first plurality of data records representing a corresponding traversable map element,
   wherein at least some of said first plurality of data records further comprise:

an executable instruction, wherein the executable instruction of a particular data record is executed upon determination that said mobile computing apparatus is at a position corresponding to a location of the corresponding map element represented by the particular data record, and further wherein said executable instruction is executed by a processor and causes data received from a hardware component to be analyzed in accordance with an algorithm encoded by or referenced by the executable instruction.

11. The component of claim 10, wherein the executable instruction comprises an instruction to access a particular record of a function repository.

12. The component of claim 11, wherein the particular record comprises at least one of an algorithm in a computer executable format or one or more parameters for use with the algorithm.

13. The component of claim 10, wherein executing the executable instruction further causes transmission of an indication of a result of analyzing the data to a computing apparatus that is external to the mobile computing apparatus.

14. The component of claim 10, wherein the executable instruction comprises at least one reporting threshold requirement, and executing the executable instruction further causes, responsive to a determination that a result of analyzing the data is satisfies the at least one reporting threshold requirement, transmission of an indication of the result of analyzing the data to a computing apparatus that is external to the mobile computing apparatus.

15. A method performed by a mobile computing apparatus comprising:

accessing, by a processor of the mobile computing apparatus, a digital map stored on a computer-readable medium, the digital map comprising a first plurality of data records, each of said first plurality of data records representing a corresponding traversable map element, wherein at least some of said first plurality of data records further comprise an executable instruction, and upon determining, based on sensor data captured by a location sensor in communication with the mobile computing apparatus, that the mobile computing apparatus has moved to a position corresponding to a location of a map element represented by a particular data record, executing, by the processor, the executable instruction corresponding to the particular data record that represents the corresponding map element.

16. The method of claim 15 wherein executing the executable instruction causes analysis of at least a portion of sensor data.

17. The method of claim 16, wherein executing the executable instruction further causes transmission of an indication of a result of analyzing the at least a portion of the sensor data to a computing apparatus that is remotely located with respect to the mobile computing apparatus.

18. The method of claim 16, wherein the executable instruction comprises at least one reporting threshold requirement, and wherein the method further comprises:

determining whether a result of analyzing the at least a portion of the sensor data satisfies the at least one reporting threshold requirement; and when the result satisfies the at least one reporting threshold requirement, transmitting an indication of the result of analyzing the at least a portion of the sensor data to a computing apparatus that is remotely located with respect to the mobile computing apparatus.

19. The method of claim 15 wherein the executing the executable instruction modifies operation of a hardware component associated with a vehicle system.

20. The method of claim 15, the executable instruction comprises an instruction to access a particular record of a function repository.

* * * * *